(12) United States Patent
Malik et al.

(10) Patent No.: US 8,145,242 B2
(45) Date of Patent: Mar. 27, 2012

(54) DETERMINING GEOGRAPHIC ZONE

(75) Inventors: Dale W. Malik, Marietta, GA (US);
Edward Michael Silver, Atlanta, GA (US); Terry Silver, legal representative, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 715 days.

(21) Appl. No.: 11/848,621

(22) Filed: Aug. 31, 2007

(65) Prior Publication Data

US 2009/0061905 A1   Mar. 5, 2009

(51) Int. Cl.
*H04W 24/00* (2009.01)

(52) U.S. Cl. ............... 455/456.6; 455/456.1; 455/456.2; 455/456.3; 455/456.4; 455/456.5

(58) Field of Classification Search ............... 455/456, 455/466, 404.2
See application file for complete search history.

(56) References Cited

U.S. PATENT DOCUMENTS

| | | | |
|---|---|---|---|
| 2004/0198397 A1* | 10/2004 | Weiss | 455/456.5 |
| 2006/0270421 A1* | 11/2006 | Phillips et al. | 455/457 |
| 2007/0243880 A1* | 10/2007 | Gits et al. | 455/456.1 |

* cited by examiner

*Primary Examiner* — Kamran Afshar
*Assistant Examiner* — Edward Zhang
(74) *Attorney, Agent, or Firm* — Thomas, Kayden, Horstemeyer & Risley, LLP

(57) ABSTRACT

Included are embodiments for determining data for at least one geographic zone. At least one embodiment of a method includes determining at least one geographic zone for monitoring and receiving data related to at least one contact of a user entering the at least one geographic zone. Some embodiments include providing an indication, to the user, that the at least one contact of the user is currently located in the determined geographic zone.

21 Claims, 14 Drawing Sheets

DETERMINING GEOGRAPHIC ZONE

TECHNICAL FIELD

This application relates to communications networks and, more specifically, to determining at least one graphic zone for users of a communications network.

BACKGROUND

As communications protocols advance, many users desire advanced functionality with regard to the information provided by a communications network. More specifically, users often desire information related to the location of other users to determine whether a certain geographical location is of a desired occupancy, whether a user knows anyone at a predetermined location, and/or other information related to users of a communications network.

SUMMARY

Included are embodiments for determining data for at least one geographic zone. At least one embodiment of a method includes determining at least one geographic zone for monitoring and receiving data related to at least one contact of a user entering the at least one geographic zone. Some embodiments include providing an indication, to the user, that the at least one contact of the user is currently located in the determined geographic zone.

Also included are embodiments of a system for determining data for at least one geographic zone. At least one embodiment includes a first determining component configured to determine at least one geographic zone for monitoring and a receiving component configured to receive data related to at least one contact of a user entering the at least one geographic zone. Some embodiments include a first providing component configured to provide an indication, to the user, that the at least one contact of the user is currently located in the determined geographic zone.

Also included are embodiments of a computer readable storage medium for determining data for at least one geographic zone. At least one embodiment includes first determining logic configured to determine at least one geographic zone for monitoring and receiving logic configured to receive data related to at least one contact of a user entering the at least one geographic zone. Some embodiments include first providing logic configured to provide an indication, to the user, that the at least one contact of the user is currently located in the determined geographic zone.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included are embodiments for providing location data to at least one user. More specifically, in at least one nonlimiting example, a user may be provided with an interface that includes location data for at least one other user. The location data may be provided via an Instant Messaging protocol, however, this is not a requirement. Similarly, in at least one exemplary embodiment, the user can define a zone for monitoring the at least one other user. The zone may be a stationary zone and/or a moving zone. If the at least one other user enters the zone, the user may be alerted of this presence within the zone. These and other embodiments are discussed in more detail below, with reference to the drawings.

Figure 1:
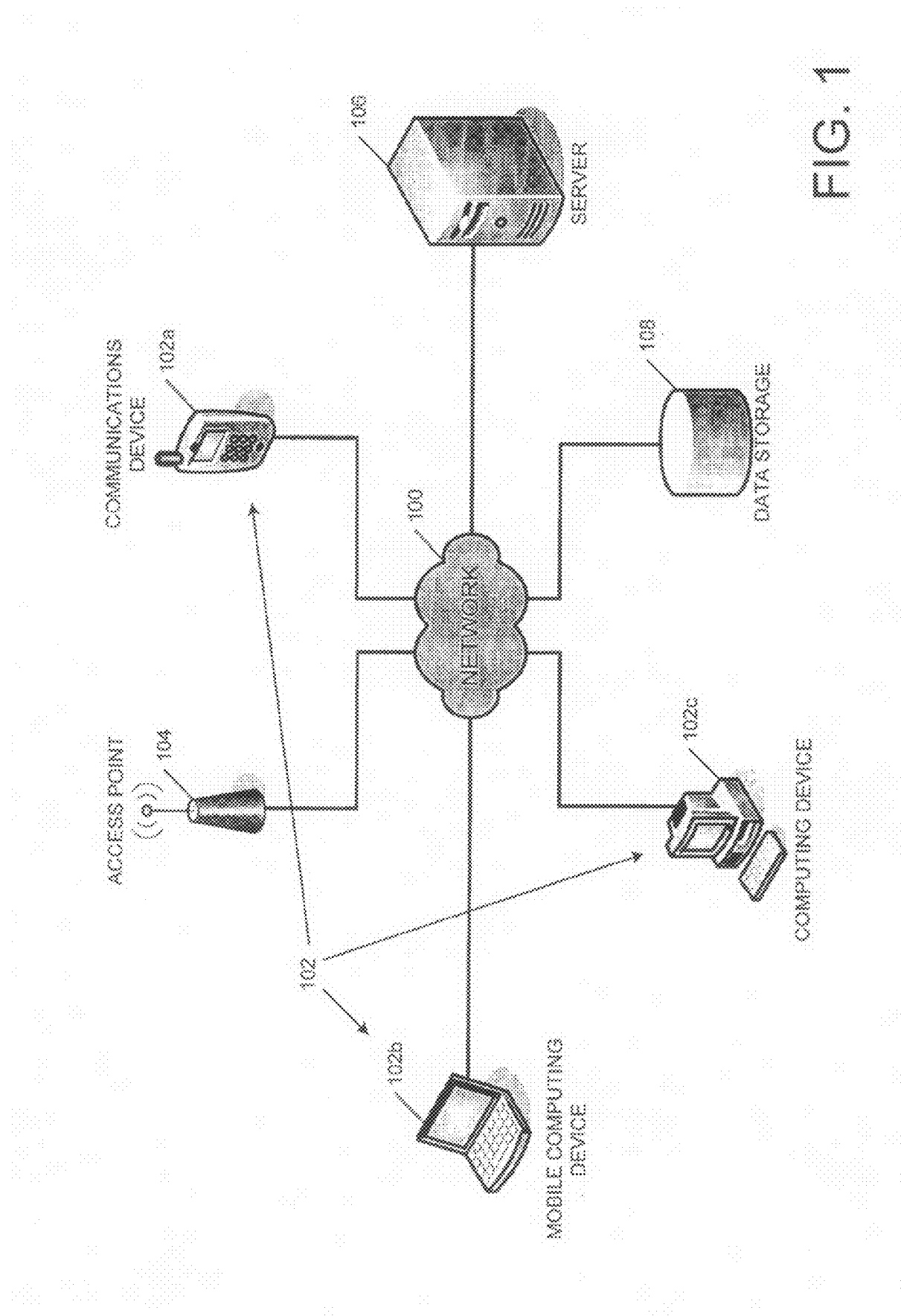
FIG. 1 is an exemplary embodiment of a network configuration, which may be utilized in facilitating communications among users.

More specifically, with regard to the drawings, FIG. 1 is an exemplary embodiment of a network configuration, which may be utilized in facilitating communications among users. As illustrated in the nonlimiting example of FIG. 1, the configuration includes a network 100, which may include an Internet Protocol (IP) based network, a telephonic based network (such as a Public Switched Telephone Network (PSTN) and/or a wireless network (e.g., cellular network, Personal Communications Service (PCS) network, and Voice over IP (VoIP) network)), a satellite network, a wireless protocol Local Area Network (LAN), and/or other networks. Coupled to the network 100 are one or more communications devices 102a, 102b, and 102c (collectively referred to as communications device 102). More the specifically, communications device 102a may include a wireless device that may be configured for mobile communications, two-way radio communications, Wireless Fidelity (WiFi) communications, WiMax communications, and/or other wireless communications.

Additionally, while the communications device 102a is illustrated as a mobile telephone, this is a nonlimiting example, as the communications device 102a may be configured as a Personal Digital Assistant (PDA), Blackberry®, personal computer, and/or other communications device.

The communications device 102c is coupled to the network 100 and may be configured as a personal computer, workstation, and/or other device. While the communications device 102c may be utilized as a wire-line device, the communications device 102b may be configured for wireless communications. Similarly, the communications device 102b is illustrated as a laptop computer, but, depending on the particular configuration, may be configured as any communications device that is configured to communicate via the network 100.

In some embodiments, the communications devices 102 may be configured to communicate with one or more other devices via an access point 104. The access point 104 may be configured as a WiFi hotspot, and/or may be configured to communicate with the communications device 102.

Also coupled to the network 100 is a server 106. The server 106 may be configured to provide geographical data services associated with one or more of the communications devices 102. The server 106 may be configured to provide Instant Messaging services, telephonic services, and/or other services in addition to the graphical data services. The server 106 may be configured to store data associated with the services provided. This data may be stored internally at the server 106 and/or at a data storage device 108, which may be coupled to the network 100.

One should note that while the server 106 is illustrated as a single component, this is a nonlimiting example. More specifically, depending on the particular configuration, one or more components may be utilized for providing geographical and/or communications described herein. Similarly, while the server 106 may be operated by a single entity (such as an Instant Messaging host, web host, and/or Global Positioning System (GPS) host), this is also a nonlimiting example, as the services discussed herein may be provided by a plurality of different entities.

Figure 2:
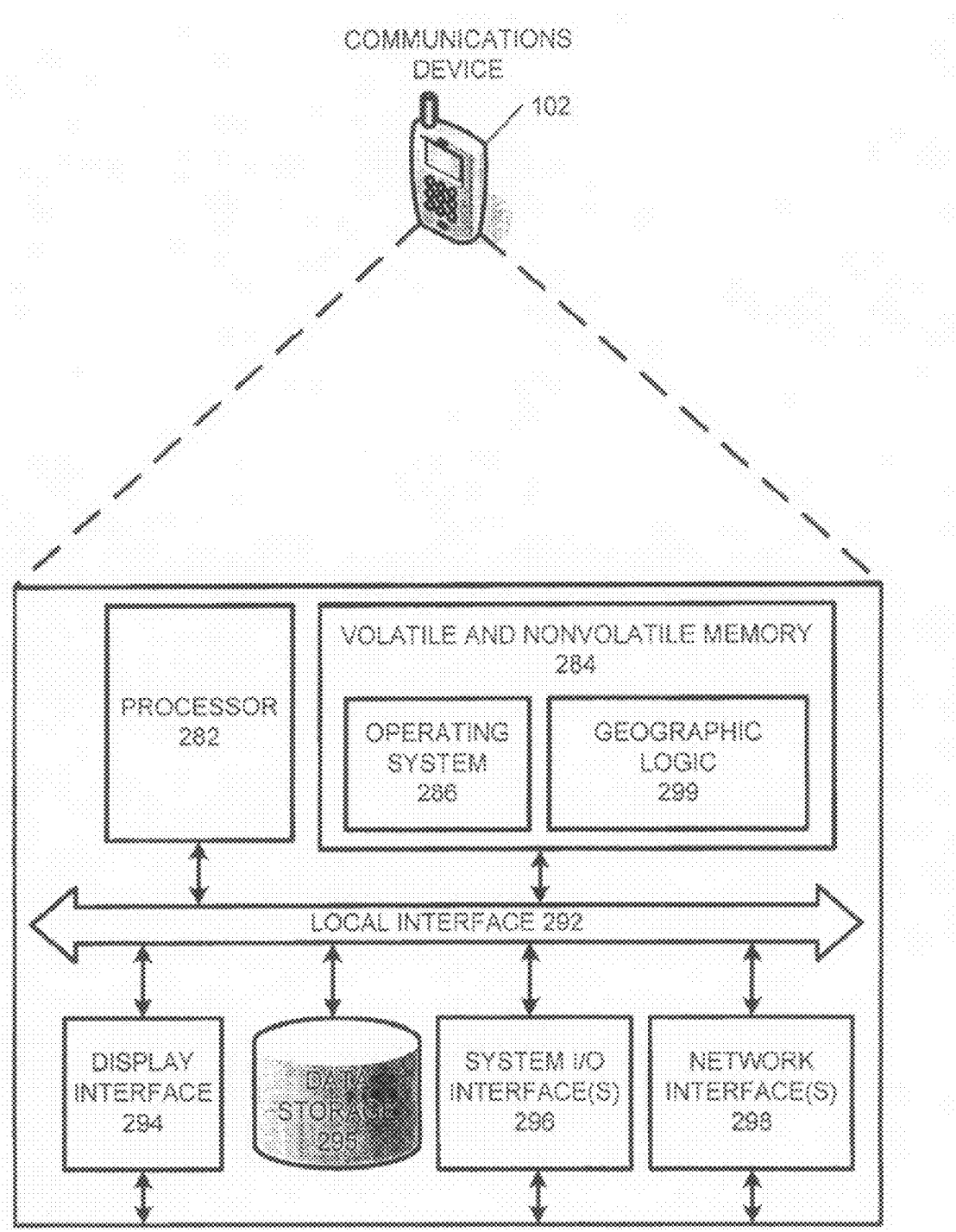
FIG. 2 is an exemplary embodiment of a communications device, such as a communications device from FIG. 1.

FIG. 2 is an exemplary embodiment of a communications device, such as the communications device 102 from FIG. 1. Although a wire-line user device (e.g., a cordless telephone) is illustrated, this discussion can be applied to wireless devices, as well. According to exemplary embodiments, in terms of hardware architecture, the communications device 102 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the communications device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM)) and/or nonvolatile memory elements (e.g., ROM, hard drive, tape, CDROM). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include geographic logic 299, as well as an operating system 286. The operating system 286 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The Input/Output devices that may be coupled to the system I/O Interface(s) 296 may include input devices, for example but not limited to, a keyboard, mouse, scanner, touch screen, microphone. Further, the Input/Output devices may also include output devices, for example but not limited to, a printer, display, and/or speaker. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router.

Additionally included are one or more of the network interfaces 298 for facilitating communication with one or more other devices. More specifically, network interface 298 may include any component configured to facilitate a connection with another device. While in some embodiments, among others, the communications device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the communications device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the communications device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the communications device 102 is activated.

When the communications device 102 is in operation, the processor 282 may be configured to execute software stored within the memory component 284, to communicate data to and from the memory component 284, and to generally control operations of the communications device 102 pursuant to the software. Software in the memory component 284, in whole or in part, may be read by the processor 282, perhaps buffered within the processor 282, and then executed.

One should note that while the description with respect to FIG. 2 includes the communications device 102 as a single component, this is a nonlimiting example. More specifically, in at least one embodiment, the communications device 102 can include a plurality of servers, personal computers, telephones, and/or other devices. Similarly, while the description of FIG. 2 describes the communications device 102, this is also a nonlimiting example, as other components may also be included in this description.

Additionally, while the geographic logic 299 is illustrated in FIG. 2 as including a single software component, this is also a nonlimiting example. In at least one embodiment, the geographic logic 299 may include one or more components, embodied in software, hardware, and/or firmware. Additionally, while the geographic logic 299 is depicted as residing on a single computing device, such as the communications device 102, the geographic logic 299 may include one or more components residing on one or more different devices.

The embodiments disclosed herein can be implemented in hardware, software, firmware, or a combination thereof. At least one embodiment disclosed herein is implemented in software and/or firmware that is stored in a memory and that is executed by a suitable instruction execution system. If implemented in hardware, as in an alternative embodiment, embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA).

Figure 3:
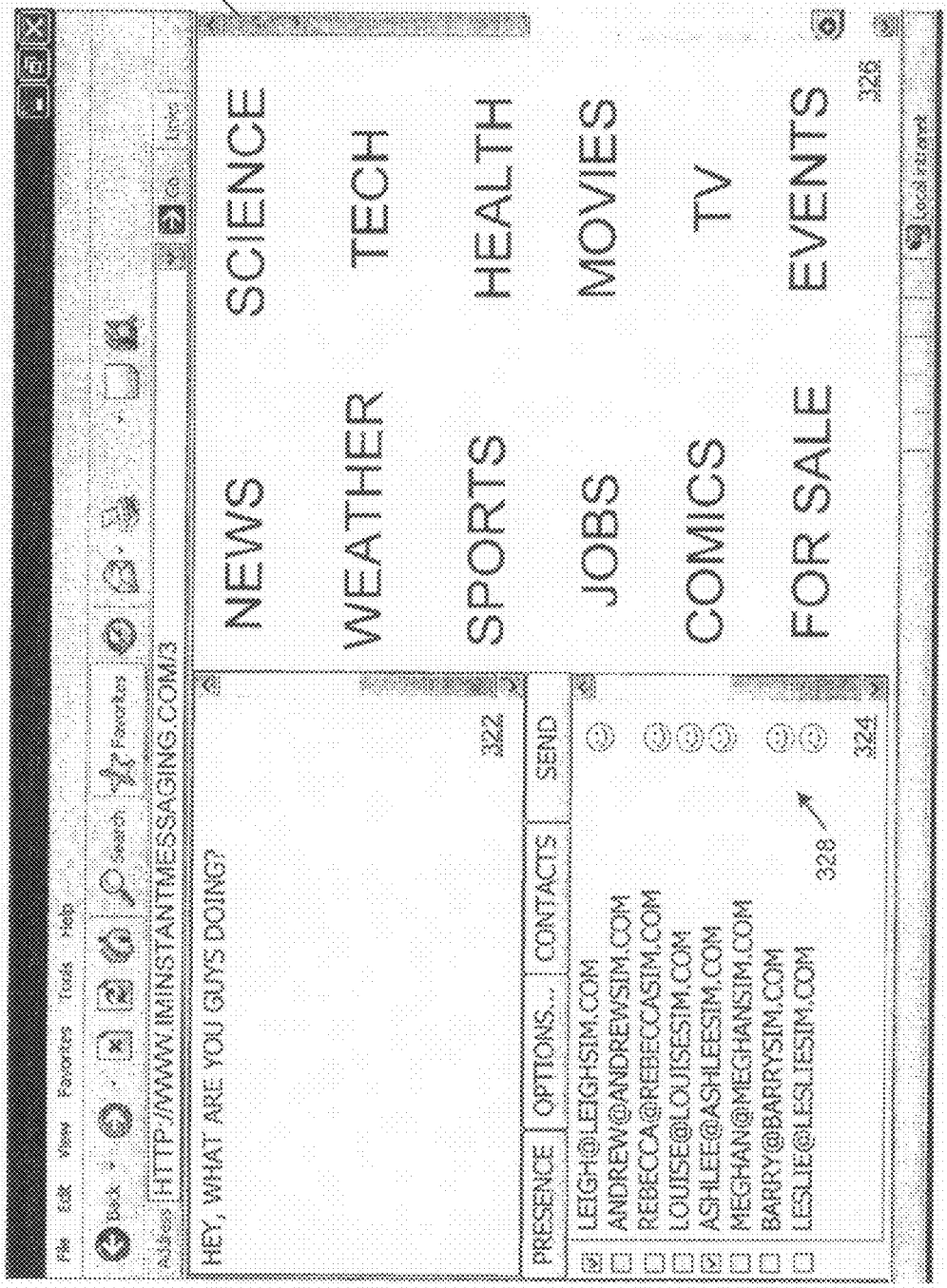
FIG. 3 is an exemplary embodiment of an interface that may be utilized for providing Instant Messaging communications, such as in the network from FIG. 1.

FIG. 3 is an exemplary embodiment of an interface 320 that may be utilized for providing Instant Messaging communications, such as in the network from FIG. 1. As illustrated in the nonlimiting example of FIG. 3, the interface 320 may be configured for Instant Messaging and/or other communications. The interface 320 may include a dialog area 322, a contacts area 324, and a categories area 326. In operation, a user may select one or more contacts in the contacts area 324 for initiating a communication. Selection of a contact may be determined by a presence indicator 328, which may be utilized to indicate whether a contact is currently "present." Upon determining the desired one or more contacts, the user can input a message in the dialog area 322.

Additionally, the categories area 326 may be utilized for providing information on one or more categories. Similarly, in some embodiments, the categories area 326 may be utilized for providing image, video, and/or other information related to a communication that is initiated in the dialog area 322 and the contacts area 324.

Figure 4:
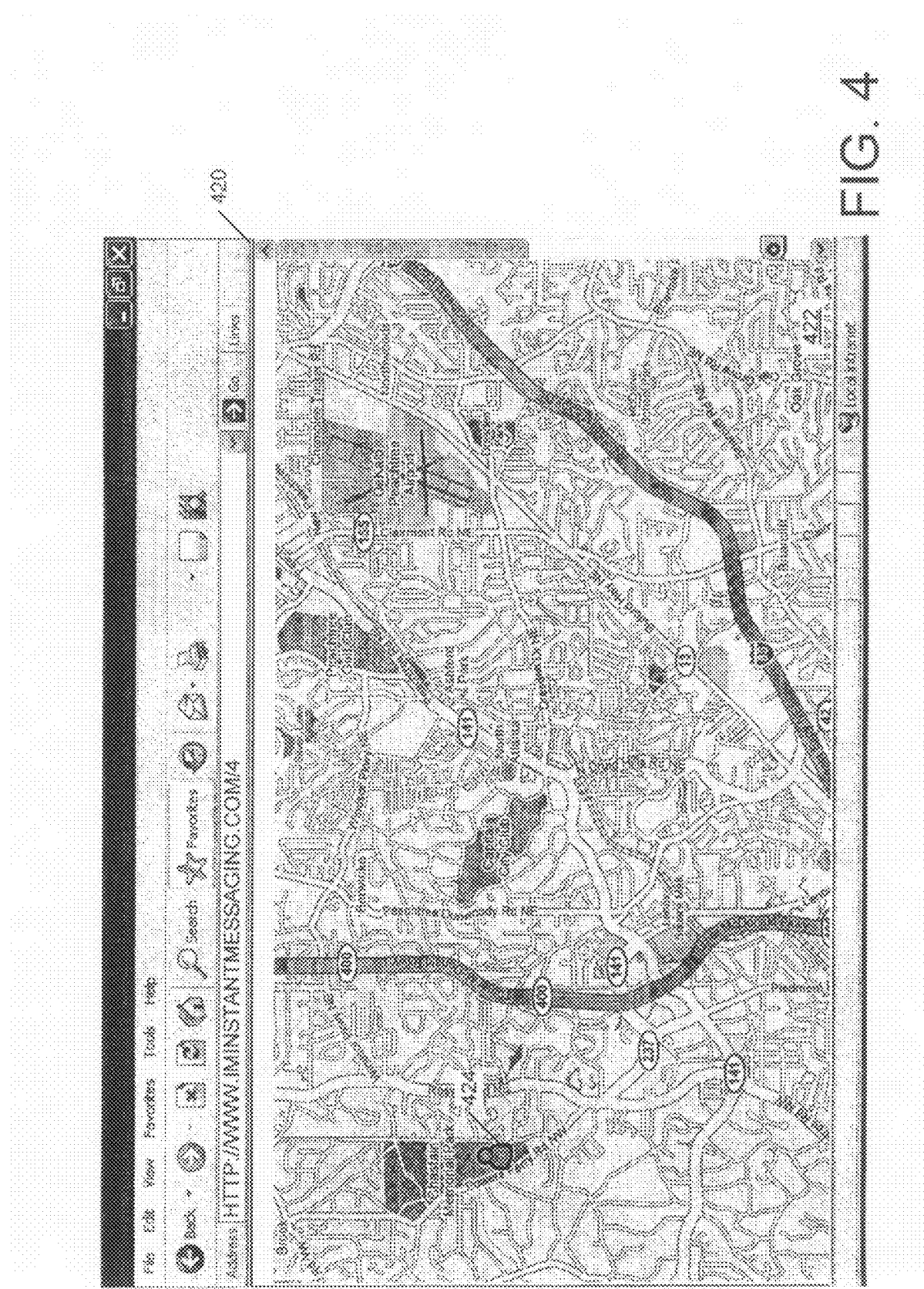
FIG. 4 is an exemplary embodiment of an interface that may be utilized for providing geographic data associated with at least one user, similar to the interface from FIG. 3.

FIG. 4 is an exemplary embodiment of an interface 420 that may be utilized for providing geographic data associated with at least one user, similar to the interface from FIG. 3. As illustrated in the nonlimiting example of FIG. 4, the interface 420 may be configured to provide a map 422 and/or other location indicators. Additionally, a user indicator 424 may be provided to indicate where the user is currently located. Depending on the particular configuration, this determination may be made via user input and/or automatically.

As a nonlimiting example, the user can input an address, intersection, zip code, and/or other information for the geographic logic 299 to provide the location indicator 424. Similarly, some embodiments may be configured to automatically determine location. As a nonlimiting example, the communications device 102 that is utilized by the user may be equipped with GPS logic for communicating with one more satellites in determining global position. In such a configuration, the GPS logic can determine the user's current location for display in the interface 420.

Similarly, some embodiments may be configured to utilize an IP address associated with the communications device 102 to determine location. Some embodiments may be configured to communicate with one or more WiFi hotspots. In such configurations, the communications device 102 can determine a user position based on an identity and known location of the WiFi hotspot. Other techniques for determining location may be utilized as a substitution for or in addition to those described above.

Upon determining the current user location, the geographic logic 299 may also be configured to determine a classification of the determined location. More specifically, referring to FIG. 4, the geographic logic 299 may be configured to determine GPS coordinates for the current position of the user to apply to the map 422. Additionally, the geographic logic 299 may also be configured to associate this position with an address, point of interest, and/or other landmark related position (e.g., Chastain Memorial Park).

Figure 5:
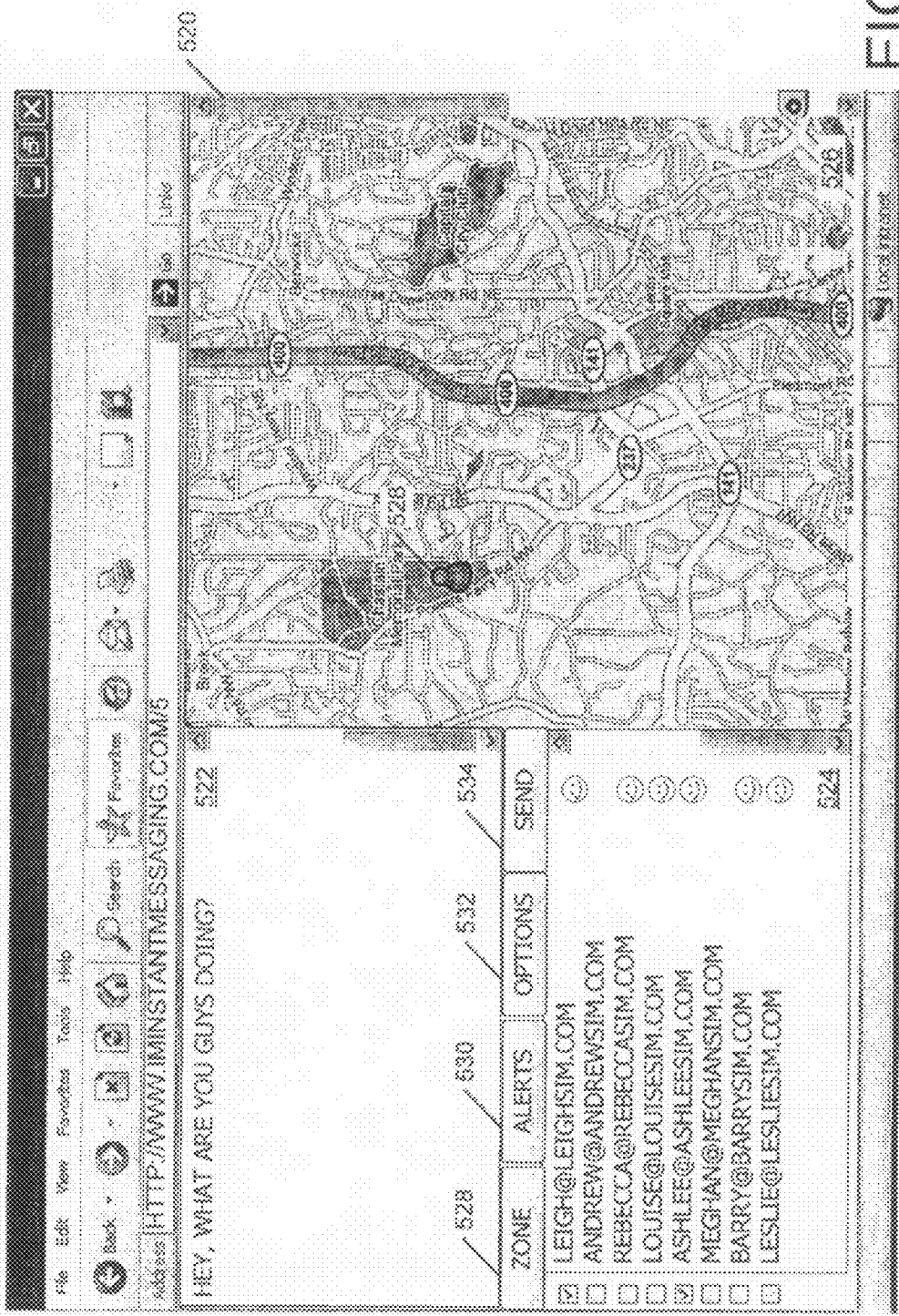
FIG. 5 is an exemplary embodiment of an interface that may be utilized to provide geographic data associated with at least one user in an Instant Messaging environment, similar to the interface from FIG. 4.

FIG. 5 is an exemplary embodiment of an interface 520 that may be utilized in providing geographic data associated with at least one user in an Instant Messaging environment, similar to the interface from FIG. 4. As illustrated in the nonlimiting example of FIG. 5, the interface 520 may be configured to provide a dialog area 522, a contacts area 524, as well as a mapping area 526. Additionally included are a zone option 528, an alerts option 530, an options option 532, and a send option 534.

In operation, the user can participate in an Instant Messaging session, telephonic session, and/or other communications session. This communications session may be displayed in the dialog area 522. Contacts and presence data may be displayed in the contacts area 524. The mapping area 526 may be configured to provide location of the user, as discussed above. Additionally, depending on the particular configuration, the geographic data associated with the user may be provided to one more other users.

Additionally, the zone option 528 may be configured to provide the user with one or more options in determining a geographic zone. The alerts option 530 may be configured to provide options related to one or more alerts. The options option 532 may be configured to provide one or more other options.

Figure 6:
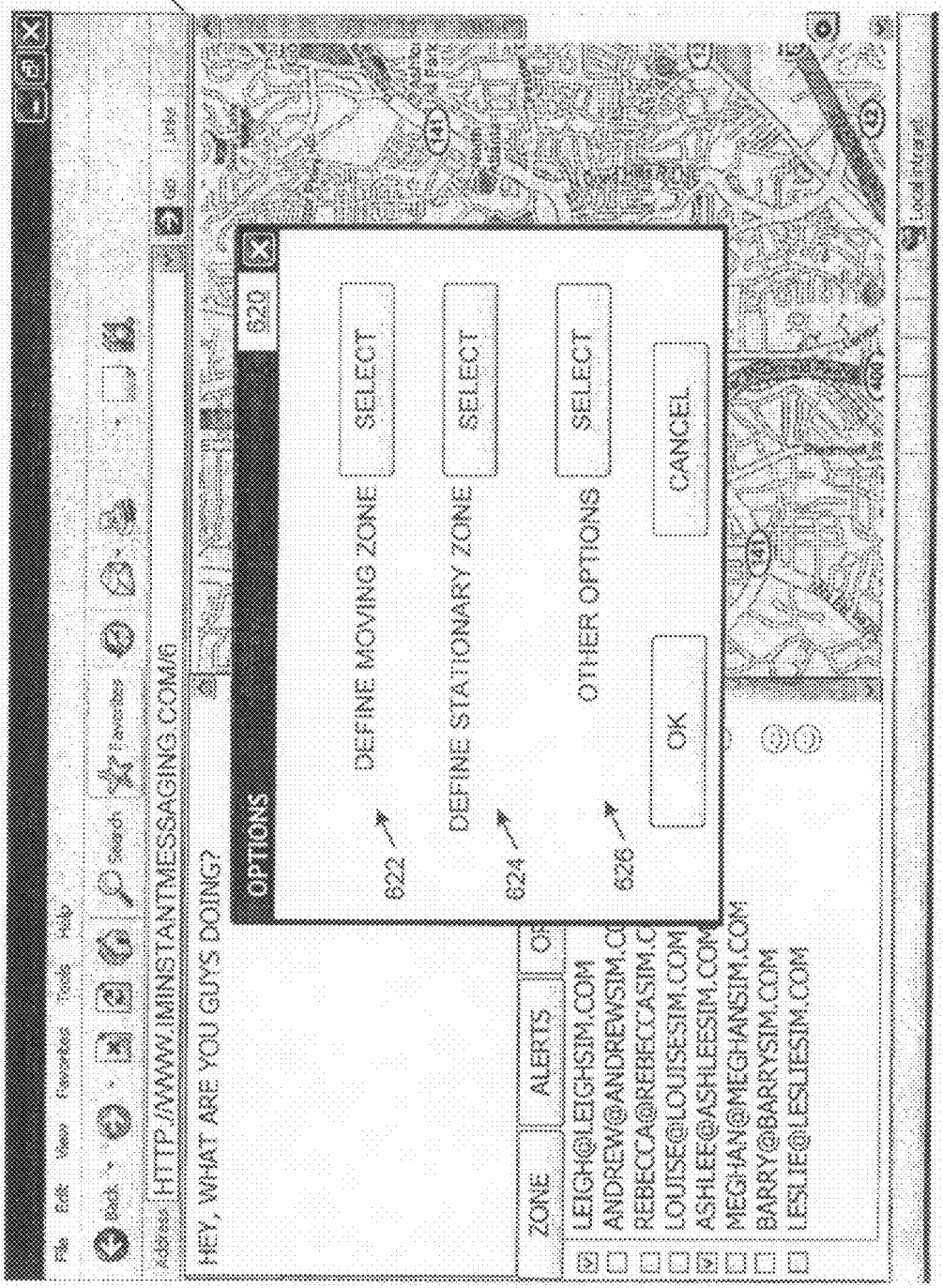
FIG. 6 is an exemplary embodiment of an interface including a plurality of options, similar to the interface from FIG. 5.

FIG. 6 is an exemplary embodiment of an interface 620 including a plurality of options, similar to the interface from FIG. 5. As illustrated in FIG. 6, the interface 620 may be configured to provide one or more options in response to selection of the options option 532 of the interface 520. More specifically, the interface 620 may be configured to provide the user with the ability to define a moving zone (option 622), define a stationary zone (option 624), as well as provide other options (option 626).

By selecting the option 622, the user can define a moving zone. The moving zone may define an area around the user that moves with the user, regardless of where the user travels. More specifically, the communications device 102 may be configured with GPS functionality for continuously/periodically monitoring the global location of the user. Additionally, the geographic logic 299 may be configured to determine, from location device from contacts of the user, whether a contact is currently within the moving zone. Additionally, the user may determine the size and/or shape of the zone based on a distance-based radius (e.g., a two mile radius), landmark-based radius (e.g., two blocks from current location), and/or via other criteria. Similarly, some embodiments may be configured to determine a default size and shape of the moving zone without user input.

Additionally, other options may be provided via the option 626. Such options may include an option to temporarily remove the moving zone in response to predetermined criteria (e.g., moving beyond a predetermined speed, when located in a predetermined area or classification of area). Similarly, other options may also include the ability to expand and/or contract the determined zone (moving and/or stationary), based on predetermined criteria (e.g., expand moving zone when located at Chastain Memorial Park, contract stationary zone between 5:00 and 7:00). Other options may also be provided.

Figure 7:
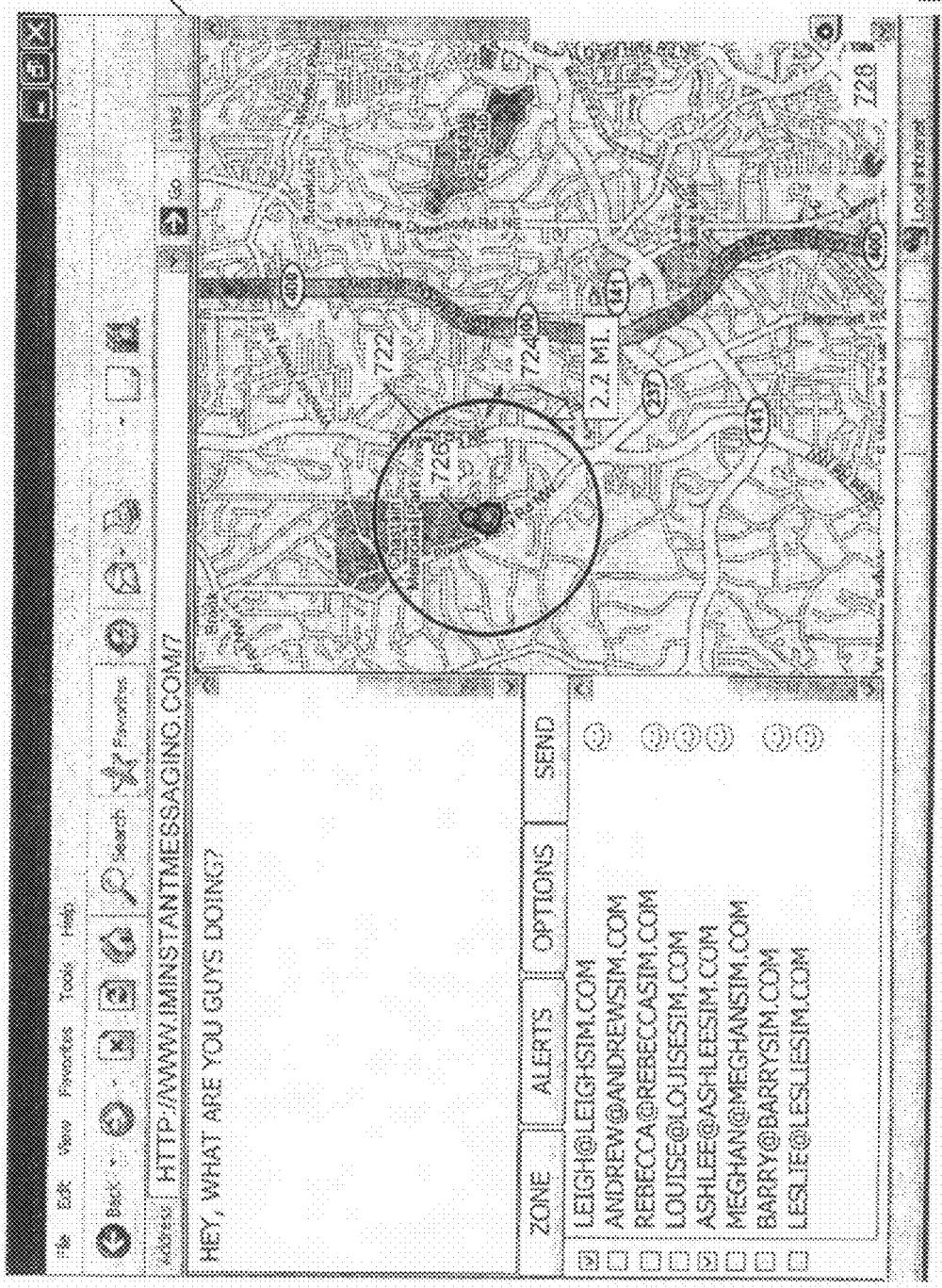
FIG. 7 is an exemplary embodiment of an interface including a moving zone, similar to the interface from FIG. 6.

FIG. 7 is an exemplary embodiment of an interface 720 including a moving zone, similar to the interface from FIG. 6. As illustrated in the nonlimiting example of FIG. 7, the interface 720 may be configured to display a moving zone 722 around the user's current position. While the options from FIG. 6 may be configured to facilitate creation of the moving zone 722, other embodiments may be configured such that a zone may be created by a cursor 724. As a nonlimiting example, the user can "drag" the cursor 724 from a user icon 726 to create the moving zone 722. The cursor 724 may also be configured to provide a size of the zone 722 (e.g., 2.2 mile radius, 4 square mile area, 3 city blocks) to the user. Additionally, a user can "hover" the cursor 724 on a previously created zone to determine the size of the zone. Similarly, some embodiments may be configured such that the user can draw the zone 722 on a mapping area 728. As discussed above, the moving zone 722 may be configured to move with the user.

Figure 8:
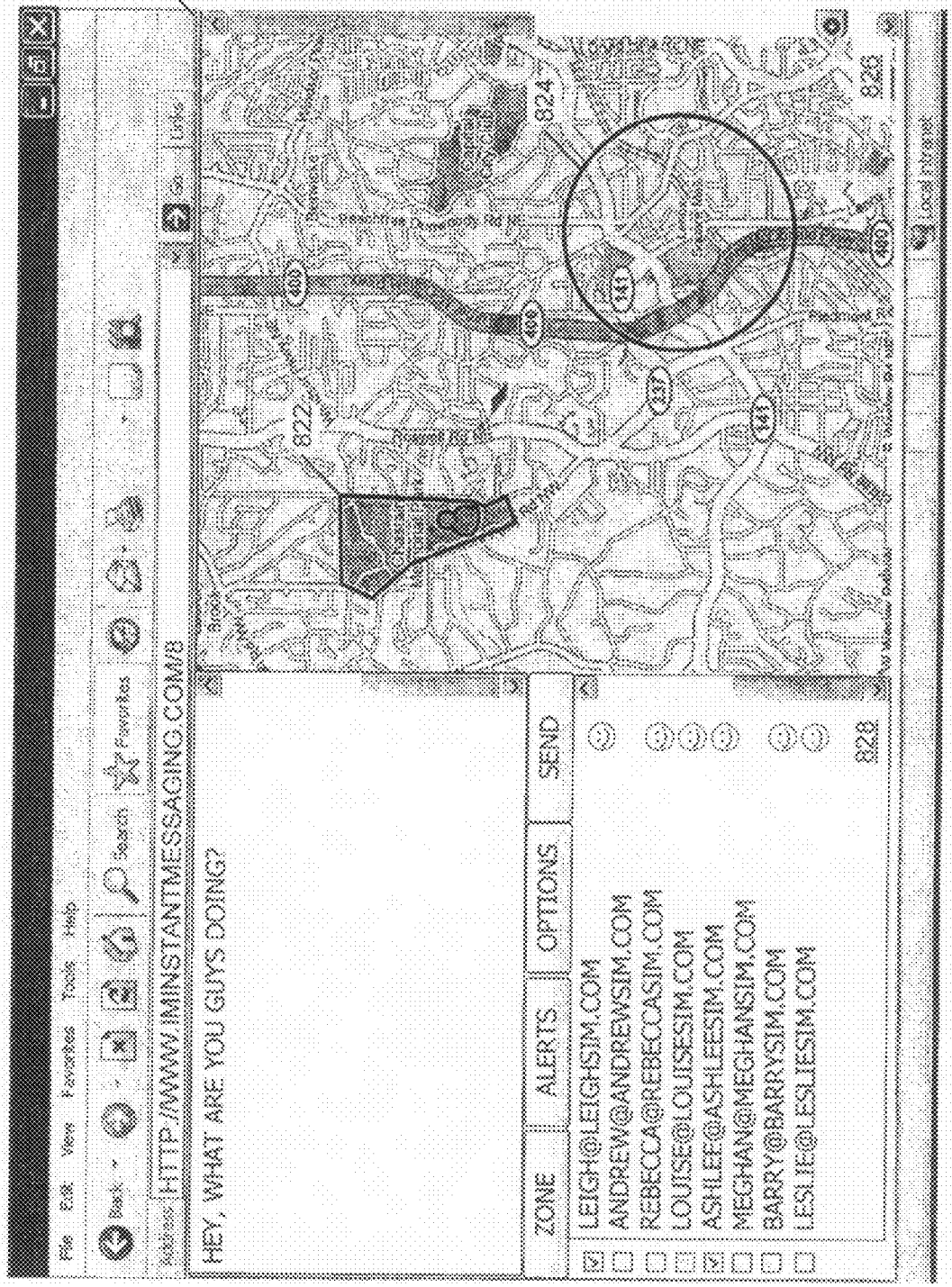
FIG. 8 is an exemplary embodiment of an interface including a stationary zone, similar to the diagram from FIG. 7.

FIG. 8 is an exemplary embodiment of an interface 820 including a stationary zone, similar to the diagram from FIG. 7. As illustrated in the nonlimiting example of FIG. 8, the interface 820 may be configured to facilitate creation and display of one or more stationary zones and/or moving zones. More specifically, in response to selection of the option 624 (FIG. 6) and/or via other techniques, the user can define a stationary zone 822, 824. The user can create a stationary zone around a predetermined landmark (e.g., Chastain Memorial Park) by indicating a desire to create a zone around this landmark. The user can create the stationary zone 822 via user input indicating creation of a zone around the perimeter of Chastain Memorial Park (such as by filling out a form for defining the area of the desired zone), and/or by drawing a zone in a mapping area 826.

Similarly, the user can create the stationary zone 824 by indicating a desired radius around a landmark (e.g., Lenox Square Mall), by dragging a cursor (not shown), as described above, and/or via other techniques. Regardless of the manner in which the stationary zone 822, 824 is created, the stationary zone 822, 824 may be configured to remain stationary, regardless of user movement.

Figure 9:
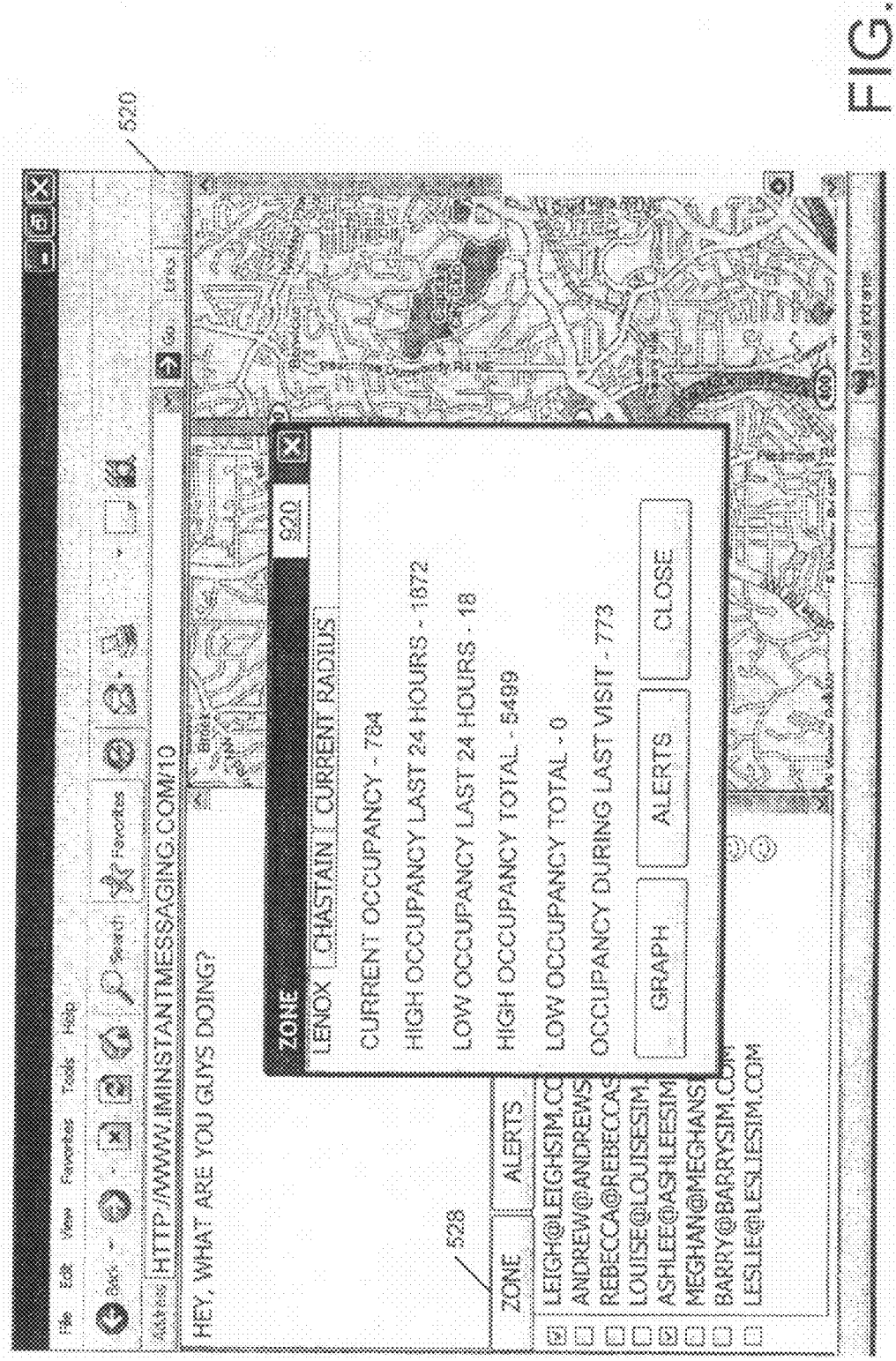
FIG. 9 is an exemplary embodiment of an interface including information related to a selected zone, similar to the diagram from FIG. 8.

FIG. 9 is an exemplary embodiment of an interface 920 including information related to a selected zone, similar to the diagram from FIG. 8. More specifically, as illustrated in the nonlimiting example of FIG. 9, the interface 520 may be configured to provide the interface 920 in response to selection of the zone option 528 (see also FIG. 5). The interface 920 may be configured to provide occupancy data associated with a predetermined zone. As described above, the user can determine one or more zones for a geographical area. At least a portion of these one or more zones may be displayed as tabs (and/or other options) in the interface 920. The tab names may be determined by a user, however this is not a requirement. Additionally included in the interface 920 is occupancy data associated with the selected zone (e.g., Lenox). The occupancy data can be determined via one or more different techniques for locating users.

More specifically, in at least one embodiment, an Instant Messaging service provider (and/or other the service provider) may determine occupancy data via GPS and/or other positioning systems. As a nonlimiting example, a communications device 102 may be configured with GPS functionality. As such, the communications device 102 can determine a global location of the device. The geographic logic 299 can receive the positioning data and send the at least a portion of this data to the Instant Messaging service provider. The Instant Messaging service provider can receive geographical data from the communications device 102 (as well as other communications devices) and determine whether the occupancy within a predetermined area.

Similarly, some embodiments may utilize one or more local networks that serve the selected zone, such as WiFi to determine the number of users in that selected zone. The one or more local networks may send the occupancy data directly to the user at the interface 920 and/or to a server (such as the server 106), which may then relay the data to the user at the interface 920. Other techniques for determining occupancy may also be implemented as a substitute or to compliment the techniques described above.

Regardless of the manner of determining occupancy, the interface 920 may be configured to provide one or more pieces of occupancy data related to the selected zone. As illustrated, this data can include, for example, current occupancy, high occupancy in the last 24 hours, low occupancy in the last 24 hours, high occupancy total, low occupancy total, and occupancy during last visit. Other statistics may also be provided, including average occupancy, occupancy for one or more subsections of the zone (e.g., the AT&T wireless store within Lenox), occupancy according to time of day and/or day of week. Graphical data may be provided, as well as alerts, as described in more detail, below.

Figure 10:
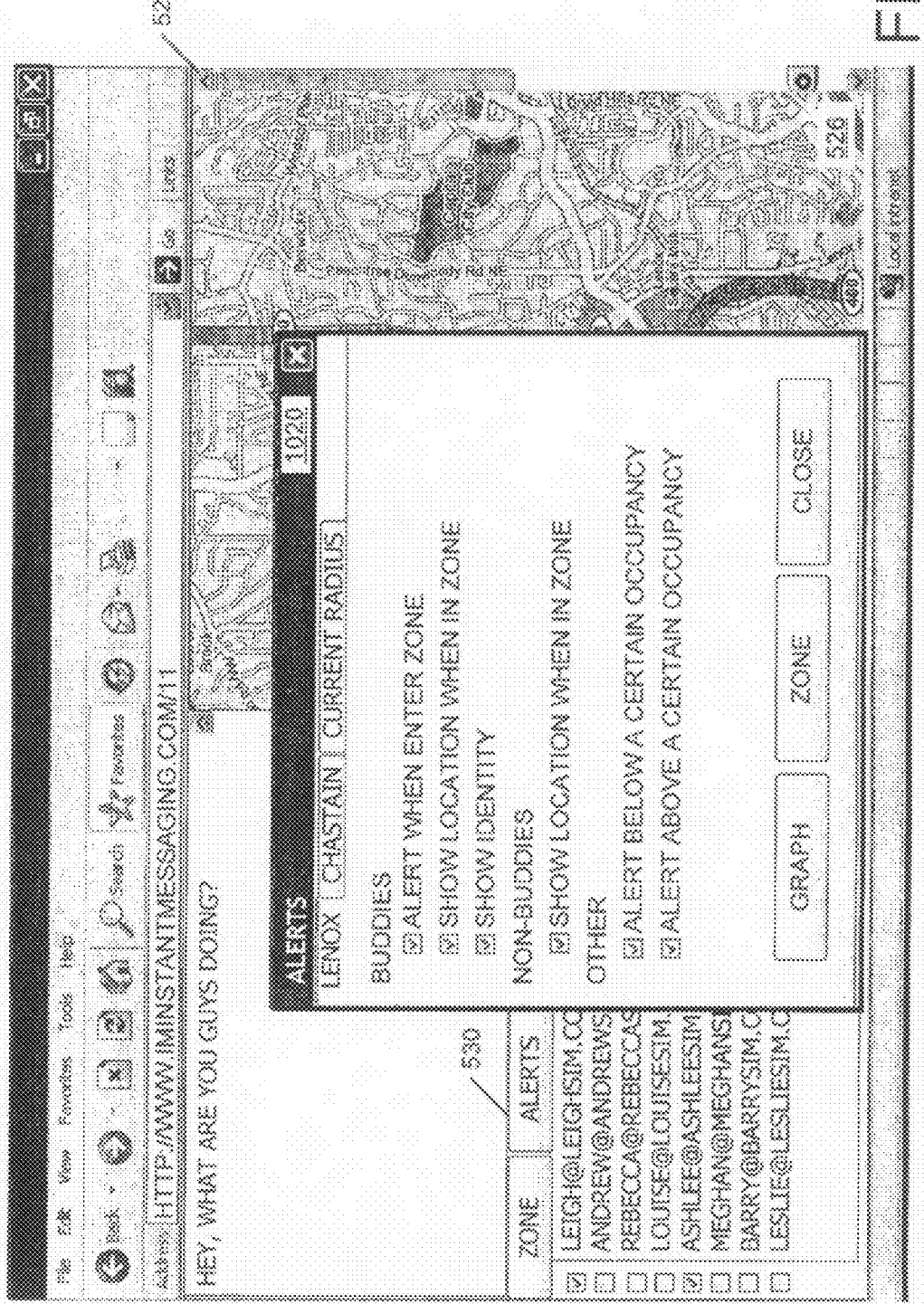
FIG. 10 is an exemplary embodiment of an interface including one or more alert options that may be selected by a user, similar to the interface from FIG. 9.

FIG. 10 is an exemplary embodiment of an interface 1020 including one or more alert options that may be selected by a user, similar to the interface from FIG. 9. As illustrated in the nonlimiting example of FIG. 10, the interface 1020 may be provided in response to selection of the alerts option 530 and/or via selection of the alerts option in the interface 920 (FIG. 9). Regardless, one or more alerts may be provided to a user regarding a geographic zone. More specifically, the user can be alerted when another user enters and/or exits a zone. The data can be associated with buddies (e.g., Instant Messaging buddies and/or other contacts) and/or non-buddies (e.g., users of the same communications service, and/or users of communications devices that are otherwise unassociated with the user) of the user.

With regard to the interface 1020, the user can select whether to receive an alert when a buddy enters a predetermined zone. Similarly, the user can select whether to receive location information related to a buddy, and/or whether to receive identification information for a buddy. More specifically, as described in more detail below, a buddy's location within a geographic zone (and/or outside of a zone) may be displayed in the mapping area 526. Similarly, the buddy's identification may also be provided to the user.

With regard to non-buddies, the user can select options related to whether to display a non-buddy's location inside a zone. Other options may include display of a non-buddy's location outside of a zone, display of a non-buddy's identity. Other options may also be provided in the interface 1020, such as alerts related to the occupancy of a particular zone. If the user desires to visit a zone when a predetermined level of occupancy has been achieved, the user can select one or more of these options to facilitate these alerts.

One should note that while the interface 1020 illustrates zone-specific options, this is a nonlimiting example. More specifically, while zone-specific options may be provided, universal options related to the display of buddies and non-buddies may be provided.

Figure 11:
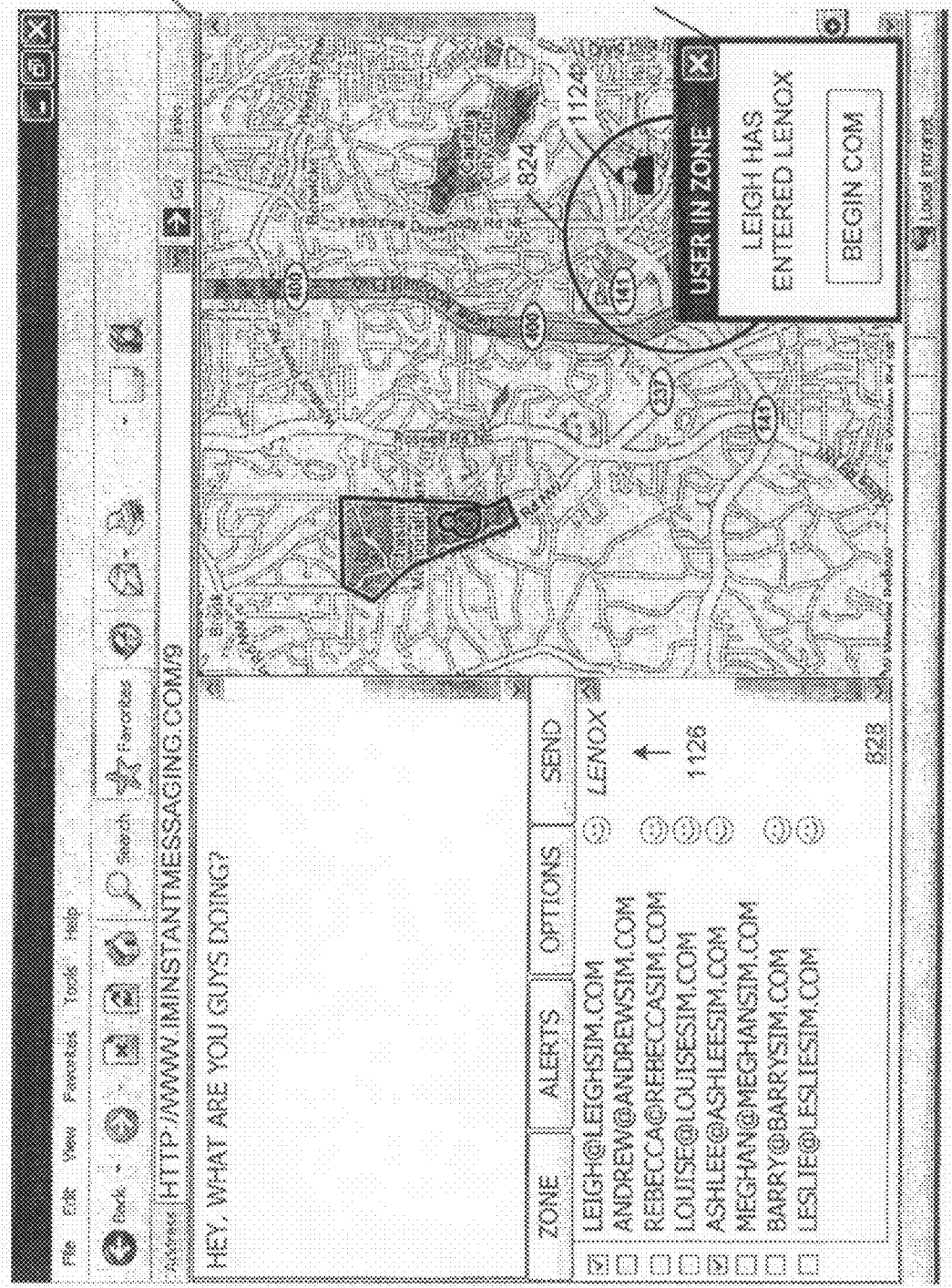
FIG. 11 is an exemplary embodiment of an interface including an alert that may be presented to a user, similar to the interface from FIG. 10.

FIG. 11 is an exemplary embodiment of an interface 1120 including an alert that may be presented to a user, similar to the interface from FIG. 10. As illustrated in the nonlimiting example of FIG. 11, the interface 820 may be configured to provide one or more alerts associated with a buddy and/or non-buddy. More specifically, Leigh has entered the Lenox zone 824, as indicated with an indicator 1124. As shown in a contacts area 828, Leigh is a buddy of the user and an alert may be provided to the user that Leigh has entered the Lenox zone 824. The user may also be provided with an option to begin a communications session (e.g., a telephone call, an Instant Messaging session) with Leigh. Also included in the contacts area 828 is a position indicator 1126, which may be included to provide the user with information related to the current position of one or more buddies and/or non-buddies.

Additionally, depending on the particular configuration, the user can send messages (and/or other types of communications) to one or more users currently located in a geographic zone. As a nonlimiting example, if a plurality of buddies is located at Chastain Memorial Park, the user can send an Instant Message to all of those buddies, without having to select each individual buddy. Similarly, standing messages may be sent such that if the user is meeting at Chastain Memorial Park at 2:00, a message can be sent to any buddy that enters the corresponding zone prior to 2:00, regardless of the buddy's current position.

One should note that while the above description relates to buddies and non-buddies, as a whole, this is also a nonlimiting example. More specifically, depending on the particular configuration, a user can create and/or subscribe to one or more interest groups. By subscribing to an interest group, alerts may be sent to other users of the same interest group, when located in a predefined zone. Similarly, messages and/or other communications may be sent to all (or a predetermined portion) of the users who are members of an interest group and located in a predetermined geographic zone. Other embodiments are also included.

Figure 12:
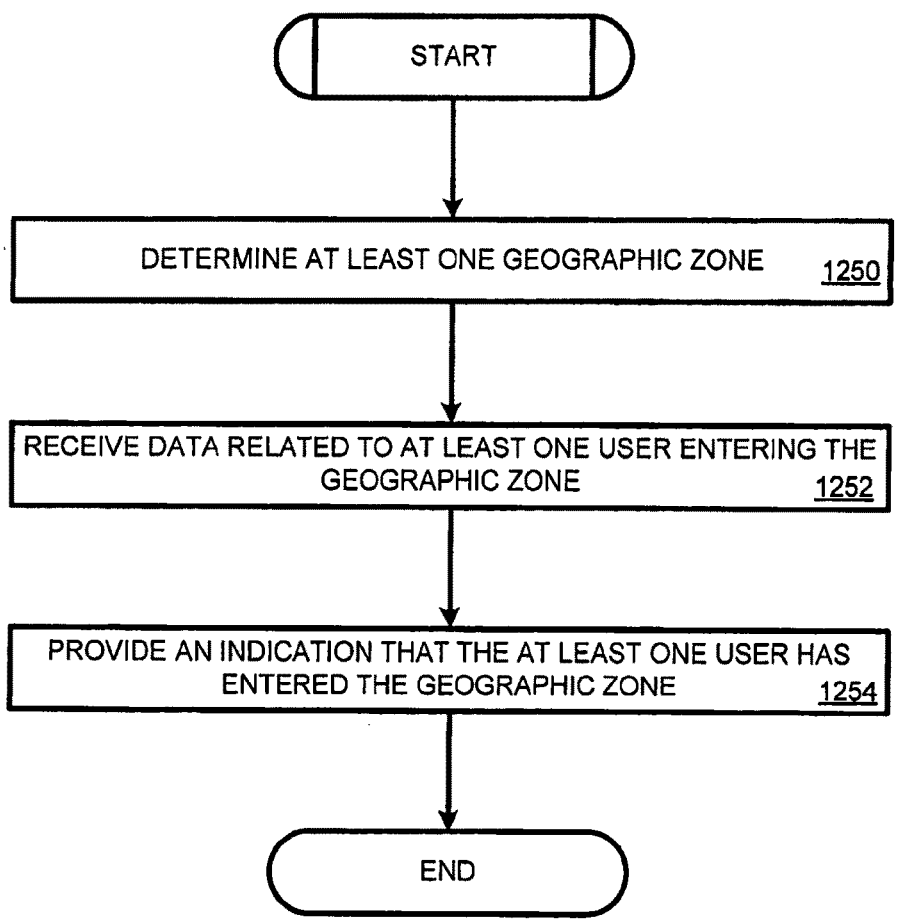
FIG. 12 is an exemplary embodiment of a process that may be utilized in providing information related to a geographic zone, such as in the network from FIG. 1.

FIG. 12 is an exemplary embodiment of a process that may be utilized in providing information related to a geographic zone, such as in the network from FIG. 1. As illustrated in the nonlimiting example of FIG. 12, the geographic logic 299 can determine at least one geographic zone (block 1250). The geographic logic 299 can receive data related to at least one user entering the geographic zone (block 1252). The geographic logic 299 can provide an indication that the at least one user has entered the geographic zone (block 1254).

Figure 13:
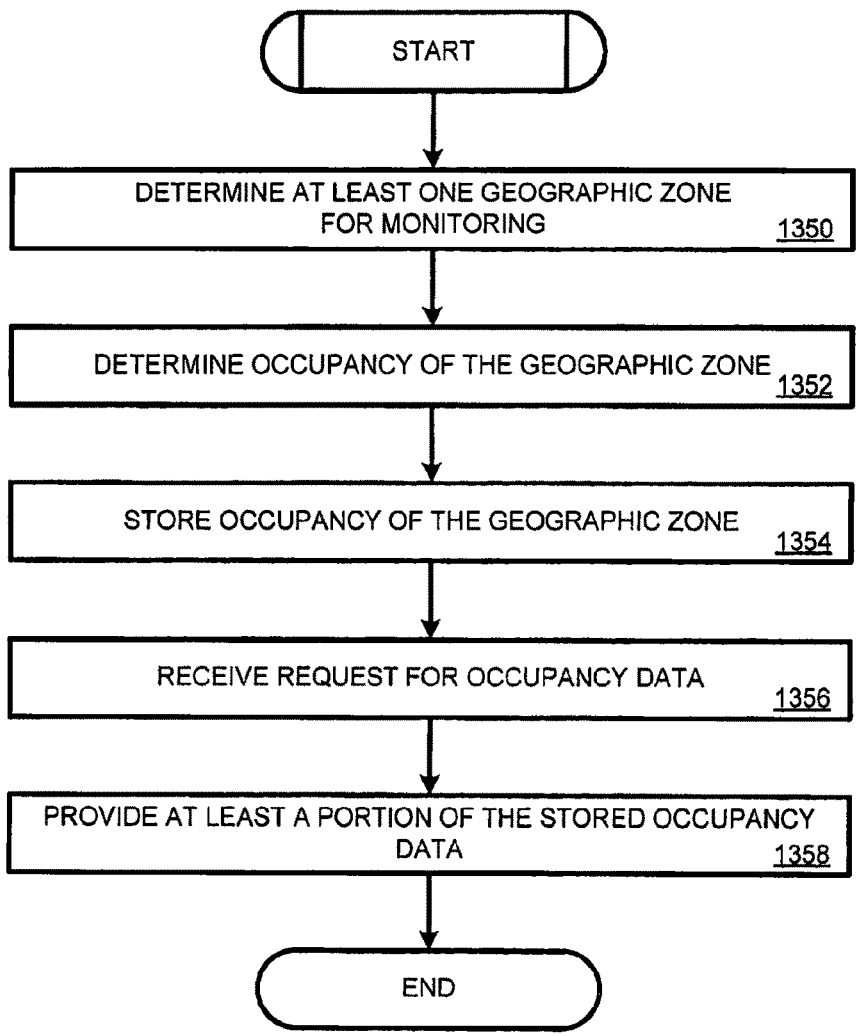
FIG. 13 is an exemplary embodiment of a process that may be utilized in providing occupancy data associated with a geographic zone, similar to the process from FIG. 12.

FIG. 13 is an exemplary embodiment of a process that may be utilized in providing occupancy data associated with a geographic zone, similar to the process from FIG. 12. As illustrated in the nonlimiting example of FIG. 13, the geographic logic 299 can determine at least one geographic zone for monitoring (block 1350). The geographic logic 299 can determine occupancy data of the geographic zone (block 1352). The geographic logic 299 can store at least a portion of the occupancy data associated with the geographic zone (block 1354). The geographic logic 299 can receive a request for at least a portion of the stored occupancy data (block 1356). The geographic logic 299 can provide at least a portion of the stored occupancy data (block 1358).

Figure 14:
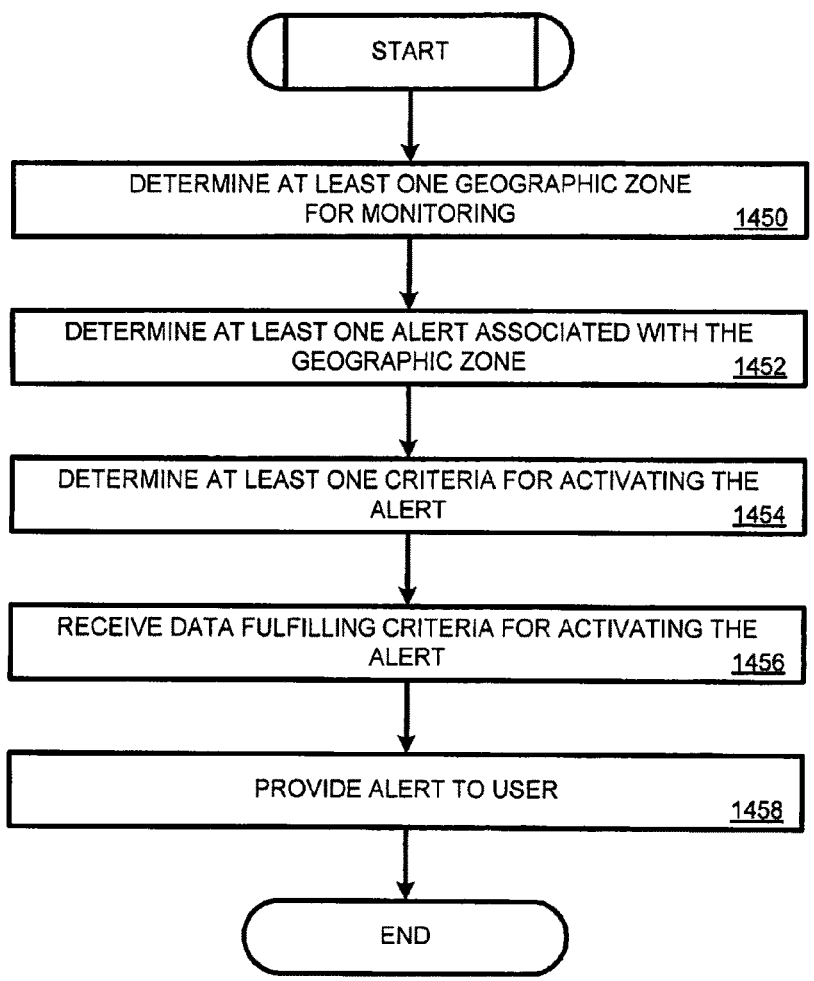
FIG. 14 is an exemplary embodiment of a process that may be utilized for providing an alert to a user, similar to the process from FIG. 13.

FIG. 14 is an exemplary embodiment of a process that may be utilized for providing an alert to a user, similar to the process from FIG. 13. As illustrated in the nonlimiting example of FIG. 14, the geographic logic 299 can determine at least one geographic zone for monitoring (block 1450). The geographic logic 299 can determine at least one alert associated with the geographic zone (block 1452). The geographic logic 299 can determine at least one criterion for activating the alert (block 1454). The geographic logic 299 can receive data fulfilling the criteria for activating the alert (block 1456). The geographic logic 299 can provide the alert to the user (block 1458).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA).

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks might occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method for determining data for a geographic zone, comprising:
   determining the geographic zone for monitoring;
   changing a size of a perimeter of the geographic zone responsive to occurrence of predetermined criteria, the predetermined criteria including a designated location for a user, a designated time of day; and a predetermined speed of the user;
   providing an option to send a message to all contacts of the user that are currently located within the geographic zone;
   receiving data related to a plurality of contacts of the user entering the geographic zone;
   providing an indication, to the user, that the plurality of contacts of the user is currently located in the geographic zone; and
   executing the option to send the message thereby causing the message to be only sent to the plurality of contacts of the user that is current located in the geographic zone, wherein the message is not sent to a contact of the user that is not currently location within the geographic zone.

2. The method of claim 1, further comprising providing a further option to initiate a communications session with a particular one of the plurality of contacts.

3. The method of claim 1, further comprising providing a user option to create the geographic zone.

4. The method of claim 1, wherein the geographic zone includes a stationary geographic zone.

5. The method of claim 1, wherein the geographic zone includes a moving geographic zone, the moving geographic zone configured to move with the user.

6. The method of claim 1, further comprising determining an occupancy of the geographic zone.

7. The method of claim 1, wherein the indication is provided via an Instant Messaging protocol.

8. A system for determining data for a geographic zone, comprising:
   a first determining component configured to determine the geographic zone for monitoring, wherein the first determining component is further configured to changing a size of a perimeter of the geographic zone responsive to occurrence of predetermined criteria, the predetermined criteria including a designated location for a user, a designated time of day; and a predetermined speed of the user;
   a first providing component configured to provide an option to send a message to all contacts of a user that are currently located within the geographic zone;
   a receiving component configured to receive data related to a plurality of contacts of the user entering the geographic zone;
   a second providing component configured to provide an indication, to the user, that the plurality of contacts of the user is currently located in the geographic zone; and
   a sending component configured to send the message only to the plurality of contacts of the user that is current located in the geographic zone in response to selection of the option to send the message, wherein the message is not sent to a contact of the user that is not currently location within the geographic zone.

9. The system of claim 8, further comprising a third providing component configured to provide a further option to initiate a communications session with a particular one of the plurality of contacts.

10. The system of claim 8, further comprising a fourth providing component configured to provide a user option to create the geographic zone.

11. The system of claim 8, wherein the geographic zone includes a stationary geographic zone.

12. The system of claim 8, wherein the geographic zone includes a moving geographic zone, the moving geographic zone configured to move with the user.

13. The system of claim 8, further comprising a second determining component configured to determine an occupancy of the geographic zone.

14. The system of claim 8, wherein the indication is provided via an Instant Messaging protocol.

15. A non-transitory computer readable storage medium for determining data for a geographic zone, comprising:
   first determining logic configured to determine the geographic zone for monitoring, wherein the first determining logic is further configured to change a size of a perimeter of the geographic zone responsive to occurrence of predetermined criteria, the predetermined criteria including a designated location for a user, a designated time of day; and a predetermined speed of the user;
   first providing logic configured to provide an option to send a message to all contacts of a user that are currently located within the geographic zone;
   receiving logic configured to receive data related to a plurality of contacts of the user entering the geographic zone;
   second providing logic configured to provide an indication, to the user, that the plurality of contacts of the user is currently located in the geographic zone; and
   executing logic configured to execute the option to only send the message thereby causing the message to be sent to the plurality of contacts of the user that is current located in the geographic zone, wherein the message is not sent to a contact of the user that is not currently location within the geographic zone.

16. The non-transitory computer readable storage medium of claim 15, further comprising a third providing component configured to provide a further option to initiate a communications session with a particular one of the plurality of contacts.

17. The non-transitory computer readable storage medium of claim 15, further comprising fourth providing logic configured to provide a user option to create the geographic zone.

18. The non-transitory computer readable storage medium of claim 15, wherein the geographic zone includes a stationary geographic zone.

19. The non-transitory computer readable storage medium of claim 15, wherein the geographic zone includes a moving geographic zone, the moving geographic zone configured to move with the user.

20. The non-transitory computer readable storage medium of claim 15, further comprising second determining logic configured to determine an occupancy of the geographic zone.

21. The non-transitory computer readable storage medium of claim 15, wherein the indication is provided via an Instant Messaging protocol.

* * * * *